United States Patent [19]

Rollenitz

[11] 4,260,246
[45] Apr. 7, 1981

[54] PROJECTION DEVICE

[75] Inventor: Leopold Rollenitz, Totzenbach, Austria

[73] Assignees: Karl Vockenhuber; Raimund Hauser, both of Vienna, Austria

[21] Appl. No.: 28,023

[22] Filed: Apr. 6, 1979

[30] Foreign Application Priority Data

Apr. 20, 1978 [CH] Switzerland .................. 4242/78

[51] Int. Cl.³ ............... G03B 27/46; G03B 27/54; G03B 27/72
[52] U.S. Cl. ............................ 355/45; 355/68; 355/71
[58] Field of Search ............ 355/5, 44, 45, 67–71, 355/74, 27, 64, 65, 35–38

[56] References Cited

U.S. PATENT DOCUMENTS

| | | | |
|---|---|---|---|
| 3,698,807 | 10/1972 | Weigl | 355/45 |
| 3,740,136 | 6/1973 | Maloney et al. | 355/45 X |
| 4,082,466 | 4/1978 | Driscoll et al. | 355/45 X |
| 4,101,213 | 7/1978 | Laskowski et al. | 355/5 |

FOREIGN PATENT DOCUMENTS 2645588 4/1977 Fed. Rep. of Germany .
2721527 11/1977 Fed. Rep. of Germany .
2131496 11/1972 France .

*Primary Examiner*—George H. Miller, Jr.
*Assistant Examiner*—W. J. Brady
*Attorney, Agent, or Firm*—Martin A. Farber

[57] ABSTRACT

A projection device with a projection system for motion picture films, transparencies, slides, etc., for their imaging (if necessary remotely) on a projection screen, a translucent light-transmitting screen or the like, the projection system having a light source and optical lens members forming an objective lens. A photographing device is provided for so-called instant pictures which are derived from the imaging and from the picture content, respectively. For the performance of the photographing of any instant picture respectively, there is provided a device for the aperture reduction of the projection system, which device increases the image sharpness on the light-sensitive layer of the instant picture to be exposed, which device is effective only during the photographing, and respectively, during the exposure, whereby the light-sensitive layer of the instant picture preferably is only arranged in the focal plane of the projection system during the photographing. Under the circumstances, for performing the photographing of an instant picture, a filter can be brought into the beam path at least to the light-sensitive layer of the instant picture, which filter increases the color temperature of the light of the projection light source.

6 Claims, 6 Drawing Figures

PROJECTION DEVICE

The invention relates to a projection device with a projection system for motion picture films, transparencies, slides, etc., for their imaging (under the circumstances remotely) on a projection screen, a translucent light-transmitting screen or the like, the projection system having a light source and optical lens members forming an objective lens.

Often on the part of the user of a projection device for movie picture films, transparencies or slides, etc., and respectively, on the part of the spectator there exists the desire to possess a paper picture of the projected image. This is true for movie picture films as well as for slides or transparencies. Basically from these it is possible to make positives, paper pictures, and respectively, proofs, however, these processes are relatively time-consuming, especially for the user, since for example the movie picture film must be released from the projector device, and thereafter quite troublesomely the corresponding individual picture must be searched and located. Furthermore it is necessary to mark the corresponding individual picture. The composition would then be made by specialists of the trade, which moreover means a waiting period of several days.

It is an object of the invention to produce a projection device by which any possible paper picture (prints, proofs, etc.) can be made directly during the projection, or respectively, directly thereafter, without carrying out troublesome manipulations of the film.

In accordance with the above-mentioned object, it is another object of the invention to provide a projector device of the introductory mentioned type, wherein a photographing device is provided for so-called instant pictures which are derived from the imaging, and respectively, from the picture content, and that for the performance of the photographing of any instant picture respectively there is provided a device for the aperture reduction of the projection system, which device increases the image sharpness on the light-sensitive layer of the instant picture to be exposed, which device is effective merely during the photographing, and respectively, during the exposure, whereby, preferably, the light-sensitive layer of the instant picture merely is arranged in the focal plane of the projection system during the photographing, and that, under circumstances if necessary, for performing the photographing of an instant picture a filter is able to be brought in the beam path at least to the light-sensitive layer of the instant picture, which filter increases the color temperature of the light of the projection light source.

The invention is based on the problem that with a projection system for the imaging of movie picture film, transparencies slides, etc. onto a projection screen, onto a translucent light-transmitting screen, etc., important other requirements are set than with a projection system for carrying out exposures of a light-sensitive (or photosensitive) layer of a picture. For the projection on a movie picture projection screen and a translucent light-transmitting screen, imaging systems are selected with a light intensity which is as large as possible and an aperture which is as large as possible, respectively. As known such type of imaging systems however do not delineate as sharp as imaging systems of smaller opening. For example lenses with a relative aperture or focal ratio (f-number) of 1:1.2 are used as projection lenses for amateur film projectors. The exposure of the light-sensitive layer of a picture of an instant film pack for example however can have an opening or aperture of 1:5.6 for achieving an image which is as sharp as possible.

For the aperture reduction of the projection system, the following solutions are proposed in accordance with other features of the invention: use of an aperture stop or aperture diaphragm, exchange of the projection objective lens, use of a light source with a smaller aperture. An aperture stop or aperture diaphragm for example could be provided in a simple manner by a pinhole diaphragm or pinhole stop which can be led or placed in the optical beam path of the projection lens, manually or under the circumstances if necessary even electromechanically. If the diaphragm is constructed as an adjustable or displaceable aperture diaphragm or aperture stop, thus the control could be carried out to a certain f-number or stop number under the circumstances if necessary also by an exposure control device, whereby the exposure of the light-sensitive layer of the instant picture could be obtimized. The conventionally used halogen lamps as projection lamps, besides the relatively large opening, also still have a relatively small color temperature of the emitted light. It is thus necessary under the circumstances to filter the light in the sense of a color temperature increase, which can be carried out by corresponding color filters, which likewise for performance of photographing, are brought into the optical beam path of the projection lens. Photoflash lamps may be used particularly advantageously for the exposure of the instant picture, since their light has the optimum color temperature. In case it is necessary, here likewise a pinhole diaphragm can be used or inserted for example between the photoflash lamp tube and the film gate aperture. If reflection mirrors are provided in the optical beam path of the projection system, then these can be constructed partly transparent and for example they can reflect red light, and blue light can pass through to the light-sensitive layer of the instant picture. In an advantageous manner the arrangement of the photographing device for instant pictures can be arranged in a transmitted light projector, the outer mass of which is barely increased by the instant picture devices. Basically also the arrangement of the instant picture device is possible with a so-called monitor for a conventional film projector or slide projector.

By the invention, for the aperture reduction of the projection system, compared to the lens for the projection onto a projection screen, a translucent light-transmitting screen or the like, a lens with a smaller aperture (for example instead of a relative aperture or focal ratio [f-number] of 1:1.2, one having a relative aperture of 1:5.6) can be brought into the optical beam path of the projection system.

Further according to a feature of the invention as a device for increasing the image sharpness, a light source is provided with a smaller aperture than during the normal projection operation of the device. Also by the invention the filter is provided by a coating layer on the lens with the smaller aperture.

According to still another feature of the invention an interference mirror is provided for the reflection of the optical beam for achieving a high color temperature of the projection light for the photographing of the instant picture. By the invention further a photoflash lamp tube is provided as the light source for the exposure of the instant picture.

Yet further with the invention the light source and/or the projection lenses, and respectively, at least their one lens member and/or a possible color filter and/or an interference mirror and/or an aperture diaphragm or the like is, or respectively, are arranged variable according to position, on a displaceable slide, a revolving carrier or the like, with respect to the stationary mounted picture gate aperture of the film gate. A handle is provided for the user of the device for varying or changing the projection system for increasing the image sharpness.

Moreover with a feature of the invention an exposure control device is provided for the instant picture photography device, by which by means of its output signal, the opening of the aperture diaphragm and/or the duration, or respectively, the number of flash pulses for each photograph can be controlled. Further according to a feature of the invention a reflection mirror is disposed in the optical beam path from the light source for the projection of the movie picture film, of the transparency or slide, etc. onto a projection screen or a translucent transmitted light screen to the film gate, the reflection mirror being formed with an opening in its central portion, the photoflash lamp tube being provided behind the opening in the mirror, whereby the photoflash lamp tube is aligned with the film gate and is provided for the exposure of the instant picture even with projection lamps which are turned on.

For performing an instant picture photographing during the movie picture projection, according to another feature of the invention a synchronization device is provided for a possibly provided shutter of the instant picture photographing device with the light sector or sectors of a rotating diaphragm for the movie picture projection.

By an inventive feature, with exposure of the instant picture over the duration of several light phases of the rotating diaphragm, a control device is provided which starts the beginning of the exposure of the instant picture exclusively at the beginning of the first light phase of the rotating diaphragm which is coordinated to this individual picture.

Also with the invention a frame mask can be brought into the optical beam path of the projection system, which frame mask is variable in its size if necessary and is variable with respect to its position relative to the optical axis of the projection system, and preferably can be imaged on a translucent transmitted light screen, on a movie projector projection screen as well as on the light-sensitive layer of the instant film pack.

With the above and other objects and advantages in view, the present invention will become more clearly understood in connection with the detailed description of preferred embodiments, when considered with the accompanying drawings, of which:

Figure 1:
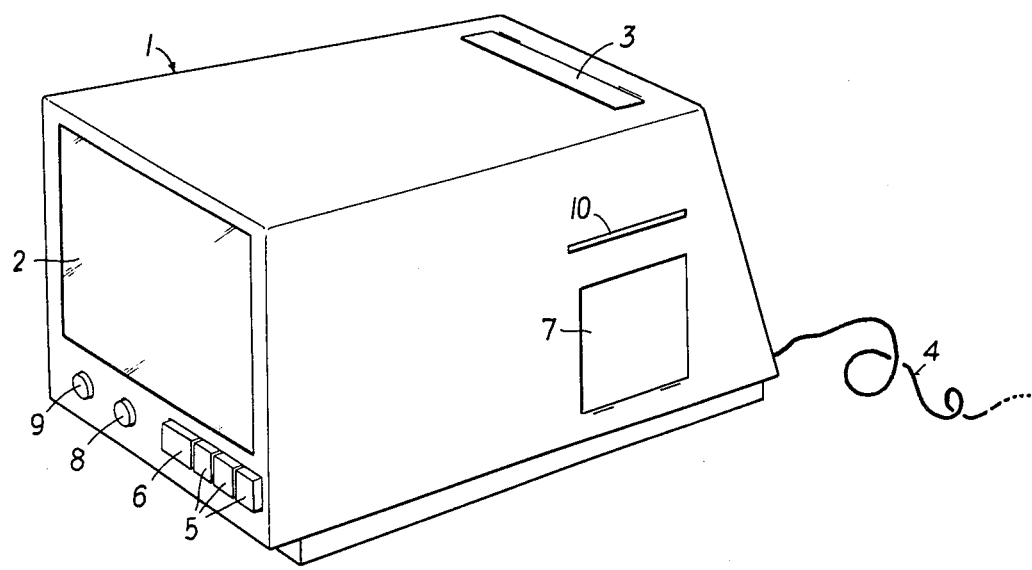
FIG. 1 is a schematic perspective view of a viewing projection screen projector device for movie picture films which is equipped in accordance with the invention.

Referring now to the drawings, and more particularly to FIG. 1, a projector device for movie picture films is designated with the numeral 1, by which the movie picture is imaged on a translucent light-transmitting screen 2. After opening of the cover 3 the movie picture film is loaded in the projector, which film for example is stored on a reel or in a cassette. The current supply of the device is provided via the mains supply cable 4. On the front side underneath the translucent screen 2 there are arranged the operating handles for service of the device in the form of push buttons 5. By means of these push buttons the individual operating modes of the projector device are selected, for example threading of the film, forward running, reverse running, fast forward, fast reverse and under circumstances if necessary also slow-motion or high-speed. The button 6 is provided as a finder button for a certain individual picture, whereby the control devices for the drive motor of the film transport devices are formed such that by a momentary or short pressing of the button 6 a transportation field is performed by one picture forwardly and upon a long actuation of the button 6 a transport step is performed rearwardly by one picture. In this manner any arbitrary individual picture of the movie picture film in a simple manner can be searched and found and can be projected, from which under circumstances a "paper picture" (print) in the form of an instant picture can be produced. Such type of so-called instant pictures or self-developing pictures are available to the operator in the form of a film pack and are able to be loaded over the loading compartment 7 in the projection device.

Figure 2:
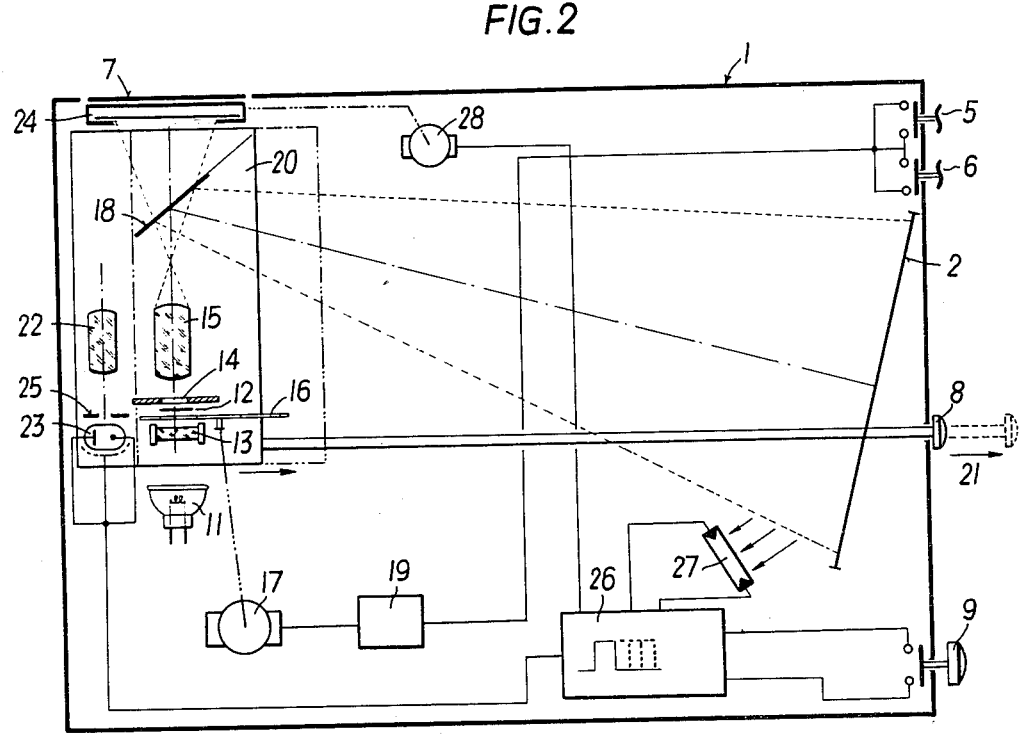
FIG. 2 is a schematic top plan view showing the arrangement of the devices for taking instant pictures in a transmitted light projector device.

If the user of the projector device by actuation of the button 5 and particularly the finder button 6 images a certain movie picture on the screen 2 of which he desires an instant picture, thus the button 8 is to be actuated. In this manner the photographic device for the instant pictures is activated. After termination of the exposure and of the development of the instant picture, the latter is ejected from the projector device through the ejection slot 10 and is available to the user. From FIG. 2 the photographing device for the production of the instant pictures can be gathered. In FIG. 2 only those mechanical and optical elements are illustrated which are necessary for the understanding of the invention. For the normal movie picture film operation the light source in the form of a filament (incandescent) lamp 11 is provided for transillumination through the movie picture film 12. The heat shield or heat-absorbing filter 13 protects the movie picture film 12 against overheating. The projector objective lens 15 is arranged in front of the picture gate aperture 14. The shutter 16 in the form of a 3-winged diaphragm is driven by the electromotor 17, which motor also is provided as the drive for the transportation devices (not illustrated), such as the claw, sprockets, winding drives, etc. In order to be able to project the movie film onto the translucent screen 2, a mirror 18 is arranged in the beam course of the projection lens 15.

The drive motor 17 is supplied with voltage by the control device 19. The desired operating mode is selected again by means of the buttons 5 and 6 as service elements for the control device 10.

The heat-absorbing filter glass or heat-reflector 13, the projector lens 15 and the reflection mirror 18 are mounted on a holder or mounting plate 20, which plate is mounted displaceably in the projection device 1. Displacement or shifting of the holder plate 20 is brought about by means of the handle 8, which handle is pulled in the direction of the arrow 21 into the dashed-line position. In this manner the heat filter 13, the projector objective lens 15 and the reflection mirror 18 are brought out from the range of the projector film gate 14 and simultaneously the second objective lens 22 is led in front of the picture gate 14. For this purpose the second objective lens 22 likewise is secured on the holder plate 20. Instead of the heat-absorbing filter 13, by means of the displacement of the holder plate 20, the photoflash lamp tube 23 has been led behind the movie picture film 12. Also the flash lamp tube 23 is rigidly connected with the holder plate 20. The second objective lens 22 is formed in its optical parameters such that the picture on the motion picture film is projected on the light-sensitive layer of an unilluminated or unexposed instant picture of the film pack 24. The film pack 24 was loaded in the projector device 1 through the loading compartment 7 as described on the basis of FIG. 1.

The photoflash lamp tube 23 provides the illumination through the movie picture film 12 during the production of an instant picture. Basically it is also possible to use the light of the lamp 11 for illumination or exposure of the instant picture, yet then the color temperature of the projector light still is to be adjusted to the requirements of the light-sensitive layer of the pictures of the film pack. For this purpose a filter etc. would be used, which for example could be arranged in the vicinity of the film gate 14, the light of a photoflash lamp tube to the contrary (Xenon light or the like) has the proper color temperature, as it is necessary for the exposure or illumination of the picture of the film pack. In an advantageous manner a diaphragm 25 is provided in front of the flash lamp tube 23 in order to achieve a satisfactory sharp image of the light picture. The light quantity which is necessary for the exposure of the instant picture is substantially constant with the regularly provided motion picture film picture. By the brightness of the picture which differs from the average brightness, the correct light quantity can be determined by means of the exposure control device 26. The exposure control device 26 is essentially provided by a control device for the flash duration of the photoflash lamp 23. For this purpose a photoresistor (photoconductor) 27 is coordinated to the control device 26, which photoresistor is applied with the light of the picture which is projected on the transmitted-light translucent screen 2. In connection with this it can also be the light which is reflected from the transmitted-light translucent screen 2. Depending upon the size of the measured brightness, the duration of the flash can be adjusted or set longer or shorter.

The release or initiation of the flash takes place by actuation of the button 9. The electromotor 28 is also set into operation by or from the exposure control device 26, which electromotor 28 is provided for driving the development device of the film pack 24, and respectively, it pushes the picture through the ejection slot 10 from the projector device 1 after conclusion of the development process.

Basically at the present time there are known two types of so-called instant pictures, or respectively, self-developing pictures. With the first type the light- or photo- sensitive layer is exposed or illuminated in the incident light techniques; with the second type to the contrary the exposure or illumination takes place by the transmitted-light (illumination) methods. With the construction of the photographing device of a projector device it is thus to be taken into consideration insofar as some optical systems, and respectively, reflection mirrors are arranged such that with respect to the type of instant picture which is to be used, under the circumstances a mirror-inverted image must be imaged on the film. Both types of instant pictures are essentially the same in the respect that the developer chemicals in the form of a paste are stored in a type of a bag under a relatively elastic cover layer. After the exposure the developing operation is started in the manner that rollers (not illustrated) which are driven by the electromotor 28 according to FIG. 2 squeeze the development paste continuously or uniformly from the bag and push it over the exposed layer. In a relatively short time subsequently there appears the image which is derived from the movie picture film or even under the circumstances if necessary from the transparency or slide or from any other copy or photographic image. The developer paste always remains inside of the layers of the instant picture.

With the embodiment according to FIG. 2 as a rotating shutter or diaphragm (stop) 16 for the movie picture projector, a multiple-winged diaphragm is used. For performing an instant picture photographing in this connection constructive measures are to be set which guarantee that the rotating diaphragm always stops at such a position that the optical beam path of the projector light actually is uncovered or open.

Figure 3:
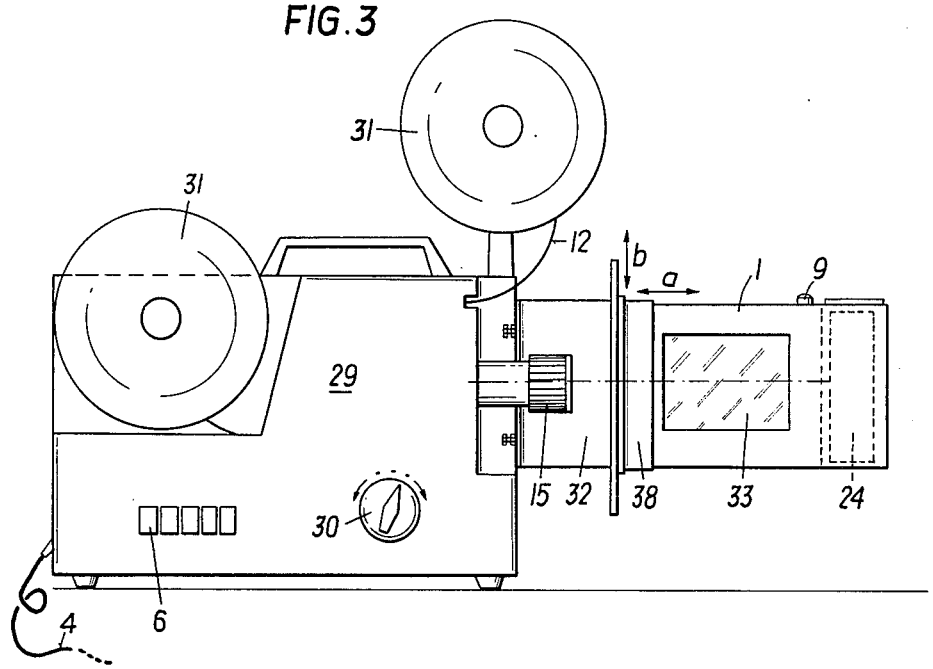
FIG. 3 is a schematic side elevational view of an additional embodiment of the invention in the form of an adapter for a movie picture projector; whereby

With the embodiment according to FIG. 3 the projector device in the form of an adapter is joined or put together with a motion picture projector 29, which per se for the projection of movie pictures in the incident light techniques, a projection screen or the like is also provided. The projector 29 has an operating mode switch 30, with which again the operating modes of fast forward, slow forward, reverse winding etc. of the motion picture film 12 are able to be controlled or set. The movie picture film 12 is mounted on reels 31. By the actuation of the button 6, which has been described on the basis of FIG. 1, in a simple manner any arbitrary individual picture of choice can be brought into still picture projection.

Figure 4:
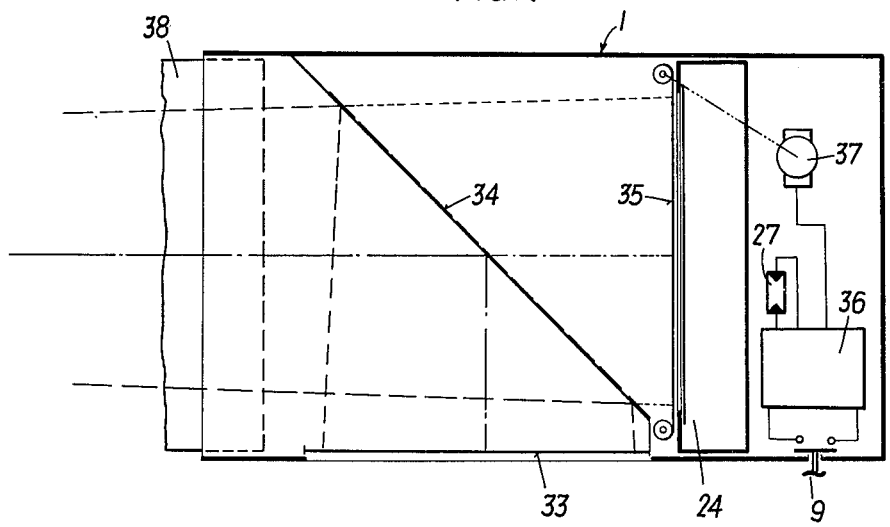
FIG. 4 shows the adaptor in a detail in a top plan view.

The projector device 1 with the film pack 24 is secured on a flange-like angle 32 and has a ground glass viewing or focussing screen 33 on which the movie picture film, and respectively, its individual pictures can or could be observed, respectively. In FIG. 4 the projector device 1 is illustrated in schematic top plan view, whereby it is evident that the image which is projected through the projector objective lens 15 falls on the reflection mirror 34 in the projection device. The reflection mirror 34 then guides the image onto the rear side of the ground glass viewing screen 33. A reflection mirror 34 is formed as a partially transparent mirror, so that a part of the light, and respectively, the image also falls on the light-sensitive or photosensitive layer of a picture of the film pack 24. The shutter 35 is arranged in front of the film pack 24, which shutter is constructed as a roll shutter. The exposure time or shutter time period, that is the duration of the opening phase of the roller shutter 35 is essentially predetermined. For corrections, in addition there is is provided a control device 36 to which the photoresistor 27 is coordinated. The exposure control device 36 under the circumstances if necessary controls the roll shutter 35. The release or initiation of a photographing likewise is brought about by means of the button 9. The electromotor 37 is provided for driving the roll shutter and is likewise controlled by the exposure control device 36. Instead of an electrical drive for the photographic shutter, it would be conceivable even to provide a spring mechanism with winding (cocking) levers (of a shutter) or the like, as it is conventional with photographic still picture cameras. The drive devices for the squeezing rollers for the application or coating of the developer paste are not illustrated with the embodiment according to FIGS. 3 and 4, respectively. The housing of the projector device 1 is constructed in two parts with the collar-like flange 38 and is displaceable in the latter (as indicated by the arrow a). Likewise the collar 38 is displaceably mounted on the angle-shaped flange 32 in the direction of the arrow b. In this manner a section of the image which section is imaged on the ground glass viewing screen 33, and respectively, on the light-sensitive layer of the film pack 24 can be freely selected.

The partially transparent reflection mirror 34 can be provided on its back side with a filter layer, which layer increases the color temperature of the projection light of the movie projector 29, and respectively, adjusts to the parameters of the film pack.

The projector device 1 according to FIGS. 3 and 4, respectively, not only can be assembled with a motion picture projector, but it is also possible to provide a slide projector, an episcope or reflecting projector or the like with a photographing part.

Figure 5:
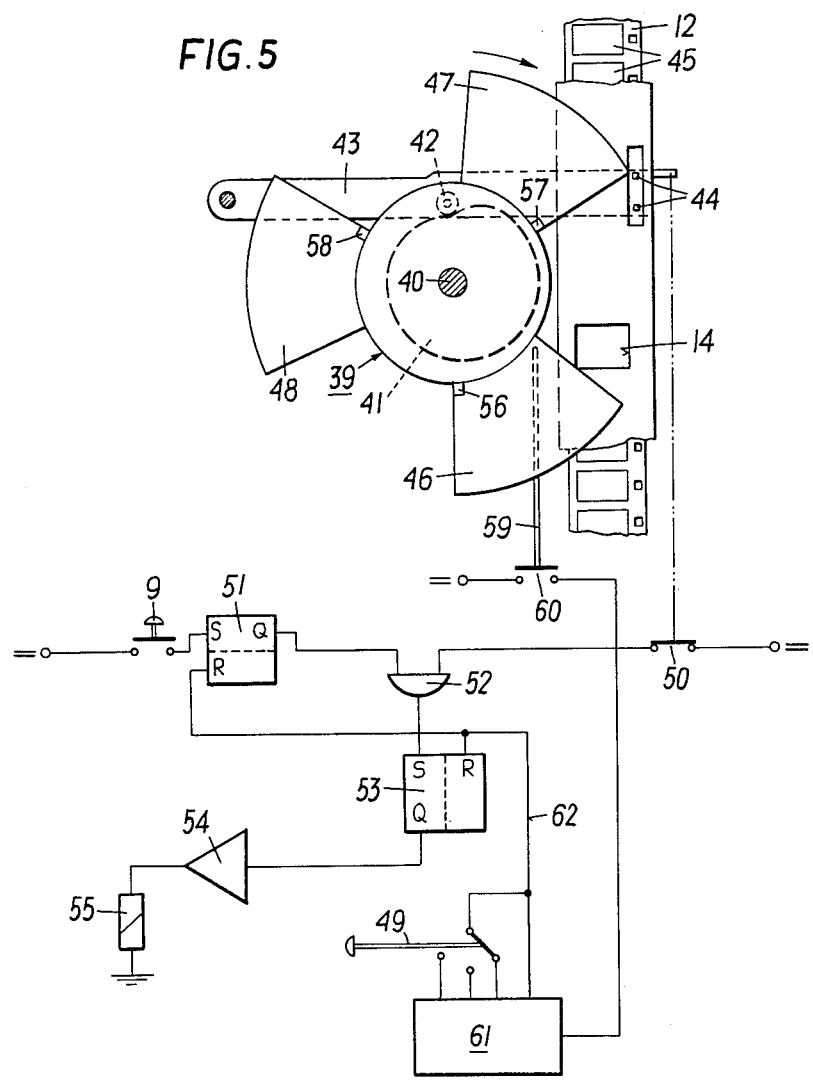
FIG. 5 is a schematic front elevational view showing the electromechanical equipment of a movie picture projector and a corresponding circuitry by which during the projection of a movie picture film, instant pictures can be made.

Also with the embodiment according to FIG. 3, it is necessary to stop the rotating diaphragm of the movie picture projector in the open position in order to guarantee the proper exposure or illumination of the still picture. It is also desireable under the circumstances if necessary, during the projection of a film, without delay and spontaneously to carry out a still picture photography of the momentarily projected image. In this connection however care must be taken with driven, for example, 3-winged rotating diaphragms, that it is guaranteed that there are used only exposure phases with the same picture content for the exposure of the light-translucent or light-transmitting layer of the instant picture pack. One such type of electromagnetic control device is illustrated in FIG. 5.

The 3-winged rotating diaphragm 39 is non-rotatably coupled with the main shaft 40 of the projector.

Likewise the cam 41 is non-rotatably connected with the main shaft 40. The cam 41 cooperates with the cam follower 42 which is secured on the claw arm 43. The transportation stroke of the claw teeth 44 is controlled by means of the cam 41. The cam 41 is positioned in its rotary position such that at the end of the transportation phase of an individual picture 45, that is, thus in the lowest position of the claw arm 43. or respectively, of the claw teeth 44, the movie picture film 12 stops and the diaphragm wing 46 uncovers or opens the picture gate 14. Before the beginning of a new transportation step, the diaphragm wings 47 and 48 still pass the picture gate 14, and respectively, the projection of the picture which is located in the picture gate 14 is interrupted three times each.

It may be assumed that, depending on the brightness of the projected picture, one, two or three light phases of one rotation of the shutter diaphragm 39 are required for the proper or regular exposure. The selection of the number of the exposure phases for an instant picture can be brought about in a practical manner by the user of the projector device in that he determines by observation of a ground glass viewing screen or a translucent screen or the like, whether the picture for example is dark, light or very light. Depending upon the brightness, he selects the number of the exposure or illumination phases by means of a handle 49. If the picture is very dark, as mentioned, three exposure or illumination phases are required, and the handle 49 is to be set in the illustrated position. In order to prevent the beginning of the exposure or illumination cycle from not beginning in the middle or at the end of the image projection, the switch 50 is coupled with the claw arm 43, which transmits or relays the actual beginning of the projection, thus the beginning of the "still time" of the movie picture film, to the electronic exposure control device. If the observer now views an image, for example on the frosted or ground glass viewing screen 33, which image he desires an instant picture of, then he actuates the button 9. The signal of the button 9, and respectively, the desire for an instant picture, is stored in the flip-flop 51, the output signal of the flip-flop being fed to the AND gate 52. Then when the contact 50 is closed by the claw arm 43, a signal is sent to the other input of the AND gate 52 and thus the AND gate 52 conducts or connects through and sends an output signal which sets the second flip-flop 53, the Q-output of which energizes a relay 55 via an amplifier or amplification stage 54, which relay 55 is provided for releasing a shutter, which shutter is arranged in front of the light-sensitive layer of the film pack. A cam 56, 57 and 58 is coordinated to each of the wings 46, 47 and 48, which cams actuate the touch contact 60 via a rod 59 which is spring-biased upwardly. The cams 56 to 58 are arranged on the wings 46 to 48 in the rotary direction of the shutter diaphragm 39 always at the beginning of a dark phase, and control the counter 61. If, for example according to the illustrated embodiment example, the counter condition of three is reached, then the output signal of the counter is fed via the line 62 to the resetting input of the flip-flops 51 and 55, whereby the relay 55 is deenergized. An internal resetting line is arranged in the counter stage 61. If for example only two exposure illumination phases are provided, thus the relay for the shutter is already deenergized after two light phases, thus by cam 58 and the touch (or send-key) contact 60 which cooperates with it. If an exposure duration is adjusted solely to the duration of one exposure phase, then the film pack shutter is controlled by the cam 57.

Also instead of the cams 56 to 58, the number of light phases could be brought about by a photoresistor or photoconductor which is brought into the optical beam path of the projector lens, the output signal of which photoresistor controls the counter stage 61. Likewise an entirely automatic exposure control could be possible in the manner that not only is the number of the phases detected by the photodetector, but also simultaneously the brightness of the scene and from the brightness of the scene, by an electronic calculating or computing device, the number of the necessary light phases for the proper or orderly illumination is determined. If the beginning of the exposure of the instant picture pack were to first begin for example after the passing of the shutter diaphragm wing 47, thus with a required number of three light phases, an exposure could take place with different pictures, which would lead to an unusable photograph.

It is conceivable to provide a mechanical, or respectively, electrical or electromechanical storage or memory device, in which device, during the projection of a film or the like by the user of the device there is only read-in, those pictures of which instant photographs are desired, so that a continuous projection course is achieved, that is undisturbed by taking of the photographs. With a new run, then according to the stored command, the individual pictures are automatically projected, under circumstances if necessary, stopped longer and the instant photographings are carried out. Particularly in order not to thermally overload the film, the projector lamp can be activated relatively shortly before the beginning of the photographing, thus some or any pictures can be activated before the photographing and afterwards the projection lamp can again be turned off.

Also measures can be taken to influence the contrast of the exposed instant photographs during the development. This is possible by a temperature change, particularly a temperature increase for the contrast enhancement.

Figure 6:
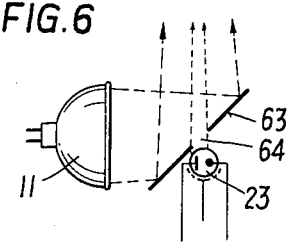
FIG. 6 is a schematic top plan view illustrating the construction of an exposure system with a reduced aperture.

FIG. 6 schematically shows the arrangement of the projection lamp 11 of a movie picture projector or slide projector, the optical light beams of which are guided via the reflection mirror 63 to the film gate or aperture. The lamp 11 has a large opening, which is of advantage for the high brightness of the projection on the movie picture projection screen which is desired. The exposure of the light-sensitive or photosensitive layer of an instant picture takes place yet by means of the photoflash lamp tube 23 which is arranged behind a central opening 64 in the reflection mirror 63. By appropriate dimensioning of the size of the opening 64, the image sharpness of focus of the film picture can be optimized. Basically it is conceivable to make an instant picture photograph without the necessity to turn the projector lamp 11 off. The light of the photoflash lamp tube 23 moreover has the appropriate level of color temperature.

Advantageously a frame for the limitation or boundary of the image can be brought in the optical beam path of the projection system. This frame is variable according to position, thus at least in certain limits, an arbitrary section of a picture of choice can be imaged. Thus it is conceivable for example with a reflection mirror of the projection system, which reflection mirror is constructed as an interference mirror, to provide it (at the edge) with a mask. This reflection mirror should be partially transparent and the frame which is formed by the mask also images on the light-sensitive layer. By adjustment or alignment of the mirror with the mask, then the optionally selected picture content can be imaged.

For all illustrated embodiment examples it is mentioned that the exposure or illumination control device is not absolutely necessary for the production of useable images by means of an instant picture. Essentially one will find a constant exposure period or duration to be sufficient. Depending upon the requirements which are set on the instant picture, perhaps in dependency on the brightness of the movie picture film, transparency or slide or the like, one will provide a light quantity correction.

While I have disclosed several embodiments of the invention it is to be understood that these embodiments are given by example only and not in a limiting sense.

I claim:

1. In a projection device with a projection system, for movie picture films, transparencies, slides, etc., for their imaging, remotely if necessary, on a screen including a projection screen, a translucent light-transmitting screen or the like, the projection system having a source of projection light, defining an aperture, having optical lens members forming an objective lens and defining an optical beam path, the improvement comprising in combination therewith a photographing device for so-called instant pictures having a light-sensitive layer which are derived from the imaging and from their picture content, respectively, including means for the performance of the photographing of any instant picture, said means for reducing the aperture of the projection system and for increasing the image sharpness on the light-sensitive layer of the instant picture to be exposed, said means being operative only during the photographing and during the exposure, respectively, said means for reducing the aperture of the projection system comprises means for bringing another lens with a smaller aperture into the optical beam path of the projection system compared to that of lenses for projection onto the screen.

2. The combination according to claim 1, wherein said another lens with the smaller aperture has a relative aperture of 1:5.6 and the lenses for the projection onto the screen have a relative aperture of 1:1.2.

3. In a projection device with a projection system, for movie picture films, transparencies, slides, etc., for their imaging, remotely if necessary, on a screen including a projection screen, a translucent light-transmitting screen or the like, the projection system having a source of projection light, defining an aperture, having optical lens members forming an objective lens and defining an optical beam path, the improvement comprising in combination therewith a photographing device for so-called instant pictures having a light-sensitive layer which are derived from the imaging and from their picture content, respectively, including means for the performance of the photographing of any instant picture, said means for reducing the aperture of the projection system and for increasing the image sharpness on the light-sensitive layer of the instant picture to be exposed, said means being operative only during the photographing and during the exposure, respectively, a filter, means for bringing said filter for performance of the photographing of the instant picture into the optical beam path at least to the light-sensitive layer of the instant picture, said filter constitutes means for increasing the color temperature of the light of the projection light source, another lens having a smaller aperture than that of lenses for the normal projection operation of the projection device, said filter constitutes a coating layer on said another lens with the smaller aperture.

4. In a projection device with a projection system, for movie picture films, transparencies, slides, etc., for their imaging, remotely if necessary, on a screen including a projection screen, a translucent light-transmitting screen or the like, the projection system having a source of projection light, defining an aperture, having optical lens members forming an objective lens and defining an optical beam path, the improvement comprising in combination therewith a photographing device for so-called instant pictures having a light-sensitive layer which are derived from the imaging and from their picture content, respectively, including means for the performance of the photographing of any instant picture, said means for reducing the aperture of the projection system and for increasing the image sharpness on the light-sensitive layer of the instant picture to be exposed, said means being operative only during the photographing and during the exposure, respectively, said means for increasing the image sharpness during exposure of the instant picture during the photographing comprises a light source with a smaller aperture than that during the normal projection operation of the projection device, said light source for the exposure of the instant picture constitutes a photoflash lamp tube, a reflection mirror is disposed in the optical beam path from the source of projection light for the projection onto the screen to a film gate, said reflection mirror is formed with an opening in a central portion thereof, said photoflash lamp tube is disposed behind said opening in the mirror, said photoflash lamp tube is aligned with the film gate and is provided for the exposure of the instant picture even with projection lamps which are turned on.

5. In a projection device with a projection system, for movie picture films, transparencies, slides, etc., for their imaging, remotely if necessary, on a screen including a projection screen, a translucent light-transmitting screen or the like, the projection system having a source of projection light, defining an aperture, having optical lens members forming an objective lens and defining an optical beam path, the improvement comprising in combination therewith a photographing device for so-called instant pictures having a light-sensitive layer which are derived from the imaging and from their picture content, respectively, including means for the performance of the photographing of any instant picture, said means for reducing the aperture of the projection system and for increasing the image sharpness on the light-sensitive layer of the instant picture to be exposed, said means being operative only during the photographing and during the exposure, respectively, means for performing an instant picture photographing during the projection of the movie picture including synchronization means for a shutter of the instant picture photographing device with at least one light sector of a rotating diaphragm for the movie picture projection.

6. The combination device according to claim 5, further comprising control means for exposure of the instant picture over the duration of several light phases of said rotating diaphragm for starting the beginning of the exposure of the instant picture exclusively at the beginning of a first light phase of the rotating diaphragm, the latter being coordinated to this particular picture.

* * * * *